US012625002B2

(12) United States Patent
Yang et al.

(10) Patent No.: US 12,625,002 B2
(45) Date of Patent: May 12, 2026

(54) SYSTEMS AND METHODS FOR TEMPERATURE MEASUREMENT

(71) Applicant: ZHEJIANG PIXFRA TECHNOLOGY CO., LTD., Hangzhou (CN)

(72) Inventors: Zhiqiang Yang, Hangzhou (CN); Wuping Lu, Hangzhou (CN); Tao Lou, Hangzhou (CN); Diquan Xu, Hangzhou (CN); Jie Zhan, Hangzhou (CN)

(73) Assignee: ZHEJIANG PIXFRA TECHNOLOGY CO., LTD., Hangzhou (CN)

( * ) Notice: Subject to any disclaimer, the term of this patent is extended or adjusted under 35 U.S.C. 154(b) by 482 days.

(21) Appl. No.: 18/307,809

(22) Filed: Apr. 27, 2023

(65) Prior Publication Data

US 2023/0366738 A1     Nov. 16, 2023

Related U.S. Application Data

(63) Continuation of application No. PCT/CN2021/114420, filed on Aug. 25, 2021.

(30) Foreign Application Priority Data

Oct. 28, 2020    (CN) .......................... 202011171160.4

(51) Int. Cl.
*G01J 5/00*      (2022.01)
*G06T 7/13*      (2017.01)
(Continued)

(52) U.S. Cl.
CPC .............. *G01J 5/0025* (2013.01); *G06T 7/13* (2017.01); *G06T 7/337* (2017.01); *G06T 7/74* (2017.01);
(Continued)

(58) Field of Classification Search
None
See application file for complete search history.

(56) References Cited

U.S. PATENT DOCUMENTS 8,300,981 B1    10/2012  Praly et al.
10,630,914 B2    4/2020  Heinke et al.
(Continued)

FOREIGN PATENT DOCUMENTS

CN        108955901        12/2018
CN        110332995        10/2019
(Continued)

OTHER PUBLICATIONS

The Extended European Search Report in European Application No. 21884618.6 mailed on Mar. 4, 2024, 8 pages.
(Continued)

*Primary Examiner* — Erica S Lin
(74) *Attorney, Agent, or Firm* — METIS IP LLC

(57)          ABSTRACT

The present disclosure provides a system and method for temperature measurement. The method may include obtaining a thermal image of an object acquired by a thermal
(Continued)

500 imaging device; identifying, in the thermal image, a first portion of the thermal image corresponding to a first target region of the object; determining, based on the first portion of the thermal image, a highest temperature of the first target region of the object; determining a target position in the first target region of the object, the target position being associated with the highest temperature; and marking, in a target image associated with the object, the target position.

20 Claims, 6 Drawing Sheets

(51) Int. Cl.

| | | |
|---|---|---|
| *G06T 7/33* | (2017.01) | |
| *G06T 7/73* | (2017.01) | |
| *G06V 40/16* | (2022.01) | |

(52) U.S. Cl.
CPC .... *G06V 40/161* (2022.01); *G01J 2005/0077* (2013.01); *G06T 2207/30201* (2013.01); *G06T 2207/30204* (2013.01)

(56) References Cited

U.S. PATENT DOCUMENTS

| | | | | |
|---|---|---|---|---|
| 2005/0111520 A1* | 5/2005 | Ignatowicz | ............ | F23M 11/04 |
| | | | | 250/339.04 |
| 2010/0172567 A1* | 7/2010 | Prokoski | ................ | A61B 5/418 |
| | | | | 348/47 |
| 2016/0367152 A1* | 12/2016 | Stepien | .................. | G01K 13/20 |

FOREIGN PATENT DOCUMENTS

| | | | | |
|---|---|---|---|---|
| CN | 110411570 | 11/2019 | | |
| CN | 110916620 | 3/2020 | | |
| CN | 111104904 | 5/2020 | | |
| CN | 111341461 | 6/2020 | | |
| CN | 111626125 | 9/2020 | | |
| CN | 111738132 | 10/2020 | | |
| JP | H04225191 A | 8/1992 | | |
| JP | 2012037408 A | 2/2012 | | |
| JP | 2014149260 A | 8/2014 | | |
| WO | WO-2021207283 A1 * | 10/2021 | ............ | G06V 20/53 |
| WO | 2022088886 | 5/2022 | | |

OTHER PUBLICATIONS

International Search Report in PCT/CN2021/114420 mailed on Oct. 28, 2021, 5 pages.
Written Opinion in PCT/CN2021/114420 mailed on Oct. 28, 2021, 6 pages.

* cited by examiner

100

200

300

<u>500</u>

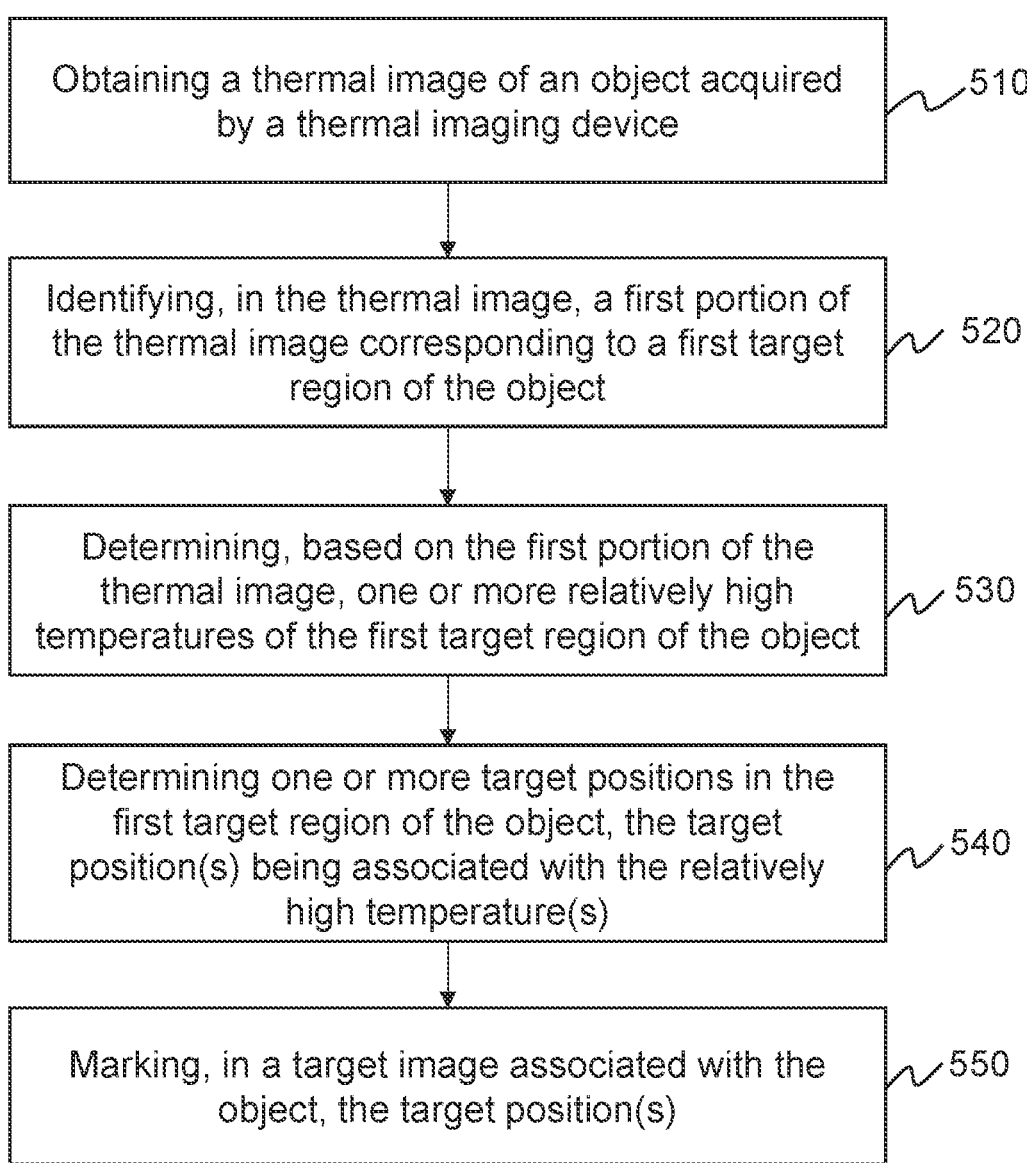

Obtaining a thermal image of an object acquired by a thermal imaging device   510

Identifying, in the thermal image, a first portion of the thermal image corresponding to a first target region of the object   520

Determining, based on the first portion of the thermal image, one or more relatively high temperatures of the first target region of the object   530

Determining one or more target positions in the first target region of the object, the target position(s) being associated with the relatively high temperature(s)   540

Marking, in a target image associated with the object, the target position(s)   550

FIG. 5

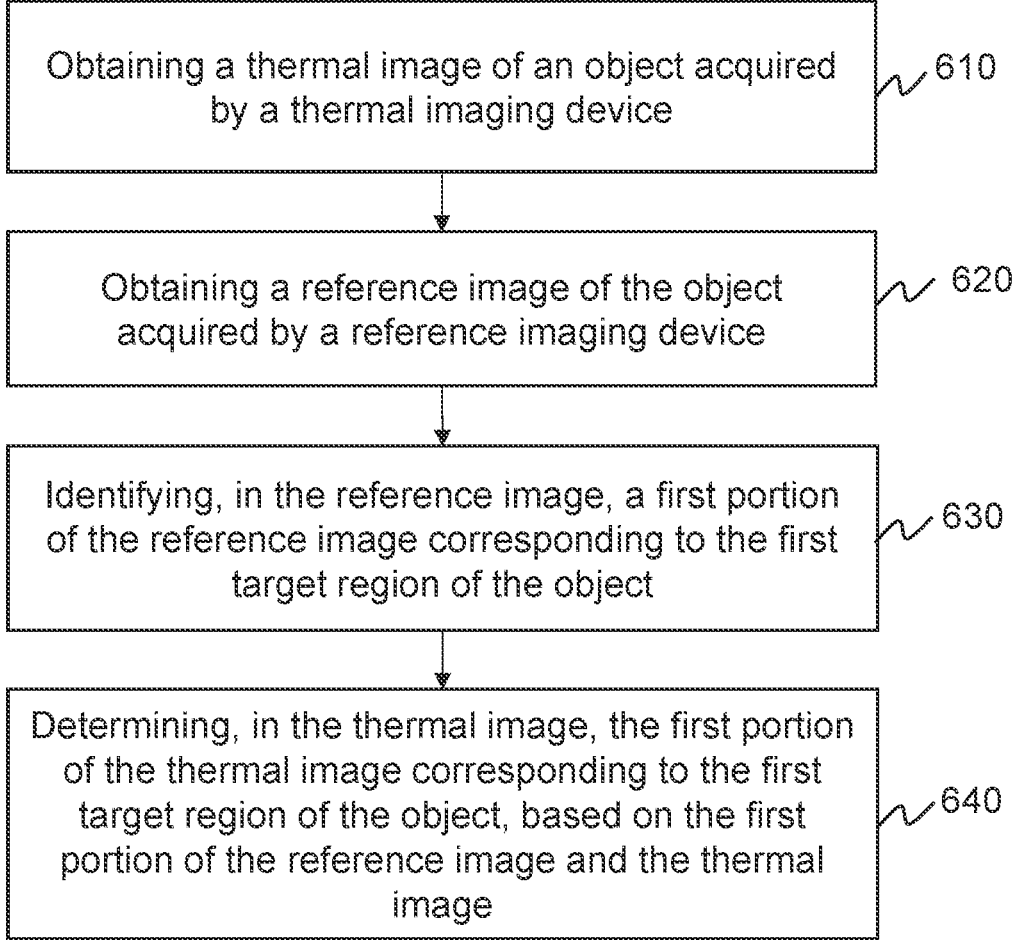

600

Obtaining a thermal image of an object acquired by a thermal imaging device ⟿ 610

Obtaining a reference image of the object acquired by a reference imaging device ⟿ 620

Identifying, in the reference image, a first portion of the reference image corresponding to the first target region of the object ⟿ 630

Determining, in the thermal image, the first portion of the thermal image corresponding to the first target region of the object, based on the first portion of the reference image and the thermal image ⟿ 640

FIG. 6

SYSTEMS AND METHODS FOR TEMPERATURE MEASUREMENT

CROSS-REFERENCE TO RELATED APPLICATIONS

This application is a continuation of International Patent Application No. PCT/CN2021/114420, filed on Aug. 25, 2021, which claims priority to Chinese Patent Application No. 202011171160.4, filed on Oct. 28, 2020, the contents of each of which are hereby incorporated by reference.

TECHNICAL FIELD

The present disclosure generally relates to measurement technology, and more particularly, relates to systems and methods for temperature measurement.

BACKGROUND

An accurate body temperature measurement is important for the diagnosis of diseases (e.g., Corona Virus Disease 2019 (COVID-19)). For example, in the prevention and control of infectious diseases, body temperature measurement is an efficient approach for confirming suspected infected human beings. A temperature range of human beings is relatively narrow, such as between 35° C. and 40° C., and the measurement accuracy of the body temperature needs to be high, so as to distinguish between suspected infected human beings and normal human beings. Specially, there may be a large flow of people in public areas such as airports, train stations, schools, shopping malls, etc., and how to accurately and efficiently measure the temperatures of human beings may be important for epidemic prevention and control. Therefore, it is desired to provide systems and methods for temperature measurement with relatively high accuracy and efficiency.

SUMMARY

According to a first aspect of the present disclosure, a system is provided. The system may include at least one storage device storing executable instructions, and at least one processor in communication with the at least one storage device. When executing the executable instructions, the at least one processor may cause the system to perform one or more of the following operations. The operations may include obtaining a thermal image of an object acquired by a thermal imaging device. The operations may further include identifying, in the thermal image, a first portion of the thermal image corresponding to a first target region of the object. The operations may further include determining, based on the first portion of the thermal image, a highest temperature of the first target region of the object. The operations may further include determining a target position in the first target region of the object. The target position may be associated with the highest temperature. The operations may further include marking, in a target image associated with the object, the target position.

In some embodiments, to identify, in the thermal image, a first portion of the thermal image corresponding to a first target region of the object, the at least one processor may be further directed to cause the system to determine a bounding box based on a contour of the first target region of the object in the thermal image and identify the first portion of the thermal image based on the bounding box.

In some embodiments, to identify, in the thermal image, a first portion of the thermal image corresponding to a first target region of the object, the at least one processor may be further directed to cause the system to obtain a reference image of the object acquired by a reference imaging device; identify, in the reference image, a first portion of the reference image corresponding to the first target region of the object; and determine, in the thermal image, the first portion of the thermal image corresponding to the first target region of the object, based on the first portion of the reference image and the thermal image.

In some embodiments, to determine, in the thermal image, the first portion of the thermal image corresponding to the first target region of the object, based on the first portion of the reference image and the thermal image, the at least one processor may be further directed to cause the system to determine a mapping relationship between the reference image and the thermal image by registering the reference image and the thermal image and determine, in the thermal image, the first portion of the thermal image corresponding to the first target region of the object, by mapping the first portion of the reference image into the thermal image based on the mapping relation.

In some embodiments, to determine, based on the first portion of the thermal image, a highest temperature of the first target region of the object, the at least one processor may be further directed to cause the system to determine, based on pixel values of a plurality of pixels of the first portion of the thermal image, a plurality of temperature values of a plurality of positions in the first target region of the object; and identify the highest temperature from the plurality of temperature values.

In some embodiments, to determine, based on pixel values of a plurality of pixels of the first portion of the thermal image, a plurality of temperature values of a plurality of positions in the first target region of the object, for each of the plurality of positions in the first target region of the object, the at least one processor may be further directed to cause the system to determine a temperature value of the each position based on a pixel value of a pixel corresponding to the each position and a lookup table indicating a relationship between a plurality of pixel values and a plurality of temperature values.

In some embodiments, the at least one processor may be further directed to cause the system to display the marked target image on a display device.

In some embodiments, the at least one processor may be further directed to cause the system to determine whether the target position is a misjudgment point. In response to a determination that the target position is a misjudgment point, the at least one processor may be further directed to cause the system to identify, in the thermal image, a second portion of the thermal image corresponding to a second target region of the object, the second portion and the first portion of the thermal image having different central positions. The at least one processor may be further directed to cause the system to determine, based on the second portion of the thermal image, an updated highest temperature of the second target region of the object. The at least one processor may be further directed to cause the system to determine an updated target position in the second target region of the object, the updated target position being associated with the updated highest temperature. The at least one processor may be further directed to cause the system to mark, in the target image, the updated target position.

In some embodiments, in response to a determination that the target position is not a misjudgment point, the at least one processor may be further directed to cause the system to designate the highest temperature of the first target region of the object as a temperature of the object.

In some embodiments, in response to a determination that the target position is a misjudgment point, the at least one processor may be further directed to cause the system to redetect temperature information of the object using the thermal imaging device or a temperature detecting device that is different from the thermal imaging device.

In some embodiments, in response to a determination that the target position is a misjudgment point, the at least one processor may be further directed to cause the system to send misjudgment information to a terminal device. The misjudgment information may be at least configured to instruct a user to adjust the first target region, or redetermine temperature information of the object.

In some embodiments, the at least one processor may be further directed to cause the system to determine whether the highest temperature is greater than or equal to a temperature threshold. In response to a determination that the highest temperature is greater than or equal to the temperature threshold, the at least one processor may be further directed to cause the system to send alarm information, one or more misjudgment points, and the marked target image to a terminal device.

In some embodiments, the terminal device may be configured to provide the marked target image and the one or more misjudgment points to a user in response to the alarm information and receive a determination result of whether the target position is a misjudgment point from the user.

In some embodiments, in response to a determination that the highest temperature is greater than or equal to the temperature threshold, the at least one processor may be further directed to cause the system to cause a thermometer to re-measure a temperature of the object. The thermometer may have a precision greater than that of the thermal imaging device.

In some embodiments, the at least one processor may be further directed to cause the system to obtain a second thermal image of the object acquired by the thermal imaging device. The at least one processor may be further directed to cause the system to identify, in the second thermal image, a third portion of the second thermal image corresponding to a third target region of the object. The third target region may include the target position. The third target region may be within the first target region. The at least one processor may be further directed to cause the system to redetermine the highest temperature of the first target region of the object by determining, based on the third portion of the second thermal image, a highest temperature of the third target region of the object. The at least one processor may be further directed to cause the system to designate the redetermined highest temperature as a temperature of the object.

In some embodiments, the first target region may include at least one of a facial region or a forehead region of the object.

According to a second aspect of the present disclosure, a method is provided. The method may be implemented on at least one computing device, each of which may include at least one processor and a storage device. The method may include obtaining a thermal image of an object acquired by a thermal imaging device; identifying, in the thermal image, a first portion of the thermal image corresponding to a first target region of the object; determining, based on the first portion of the thermal image, a highest temperature of the first target region of the object; and determining a target position in the first target region of the object. The target position may be associated with the highest temperature. The method may further include marking, in a target image associated with the object, the target position.

According to a third aspect of the present disclosure, a system is provided. The system implemented on a computing device may have a processor, a storage medium, and a communication platform connected to a network. The system may include an acquisition module configured to obtain a thermal image of an object acquired by a thermal imaging device; an identification module configured to identify a first portion of the thermal image corresponding to a first target region of the object in the thermal image; a temperature determination module configured to determine a highest temperature of the first target region of the object based on the first portion of the thermal image; a position determination module configured to determine a target position in the first target region of the object, the target position being associated with the highest temperature; and a marking module configured to mark the target position in a target image associated with the object.

According to a forth aspect of the present disclosure, a non-transitory computer readable medium storing at least one set of instructions is provided. When executed by at least one processor, the at least one set of instructions may direct the at least one processor to perform a method. The method may include obtaining a thermal image of an object acquired by a thermal imaging device; identifying, in the thermal image, a first portion of the thermal image corresponding to a first target region of the object; determining, based on the first portion of the thermal image, a highest temperature of the first target region of the object; and determining a target position in the first target region of the object. The target position may be associated with the highest temperature. The method may further include marking, in a target image associated with the object, the target position.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for temperature measurement according to some embodiments of the present disclosure; and FIG. 6 is a flowchart illustrating an exemplary process for identifying a portion of a thermal image corresponding to a region of an object according to some embodiments of the present disclosure.

DETAILED DESCRIPTION

Figure 1:
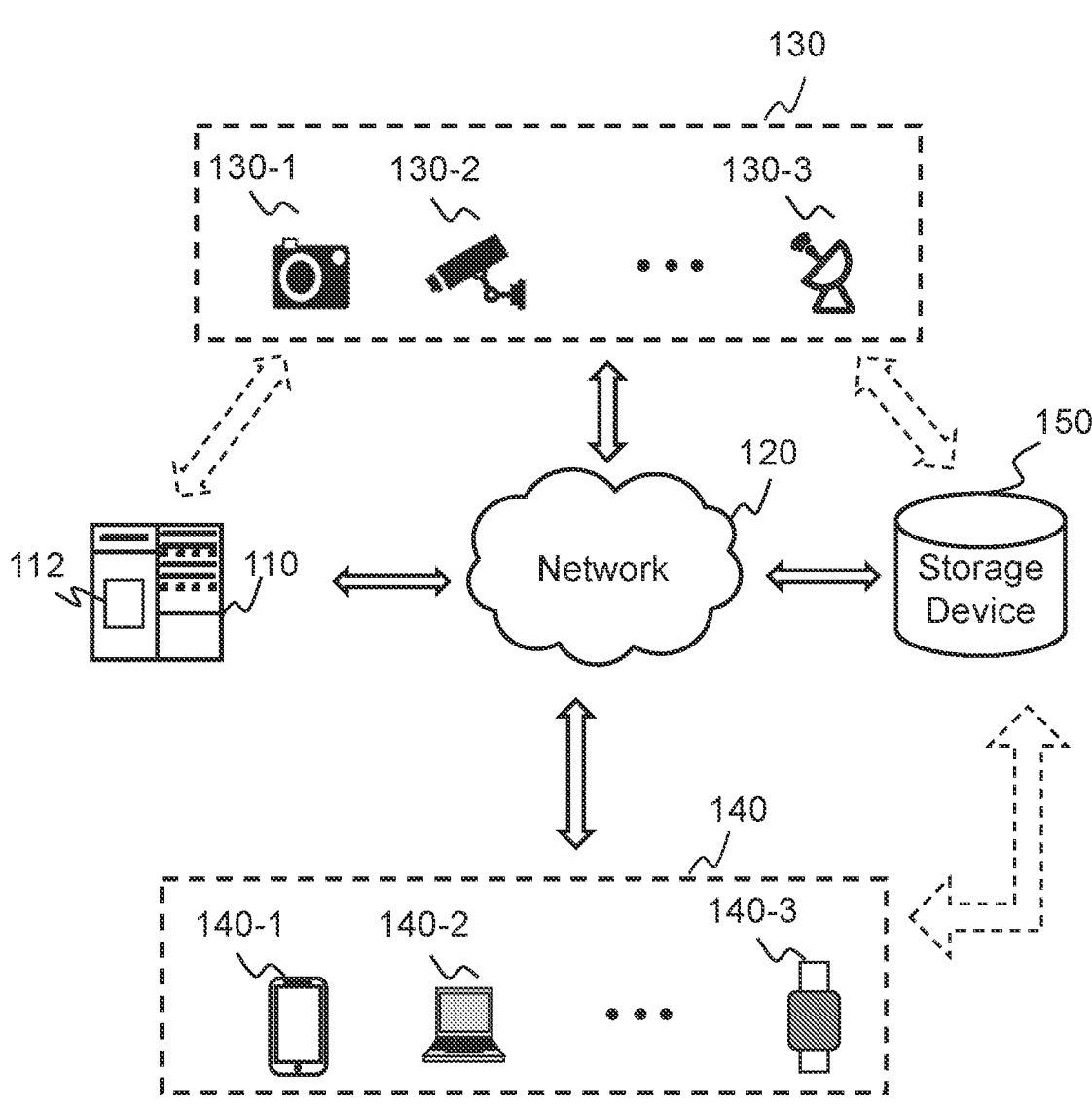
FIG. 1 is a schematic diagram illustrating an exemplary temperature measurement system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/ blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It should also be understood that terms such as "top," "bottom," "upper," "lower," "vertical," "lateral," "above," "below," "upward(s)," "downward(s)," "left-hand side," "right-hand side," "horizontal," and other such spatial reference terms are used in a relative sense to describe the positions or orientations of certain surfaces/parts/components of a vehicle with respect to other such features of the vehicle when the vehicle is in a normal operating position and may change if the position or orientation of the vehicle changes.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for temperature measurement. The systems and methods may obtain a thermal image of an object acquired by a thermal imaging device. The systems and methods may identify, in the thermal image, a first portion of the thermal image corresponding to a first target region of the object. The systems and methods may determine, based on the first portion of the thermal image, a highest temperature of the first target region of the object. The systems and methods may further determine a target position in the first target region of the object. The target position may be associated with the highest temperature. The systems and methods may mark, in a target image associated with the object, the target position.

Compared with conventional temperature measurement techniques which detect (or measure) the temperature of a relatively large region of an object, the systems and methods of the present disclosure may determine the temperature of the object based on a target position in a region of interest (e.g., the forehead, the face) of the object. Further, the target position (that has the highest temperature of the object) may be marked on a target image associated with the object, thereby facilitating subsequent processing (e.g., determining whether the target position is a misjudgment point (e.g., a corner of an eye, a neck position) that may interfere with temperature measurement), avoiding using the temperature of a misjudgment point as the temperature of the object, and improving the accuracy of temperature measurement). Besides, it is easy to redetect the temperature of the target position to verify whether the temperature of the object is accurate, when the temperature of the object is relatively high (e.g., the temperature of the object is higher than or equal to a temperature threshold).

FIG. 1 is a schematic diagram illustrating an exemplary temperature measurement system according to some embodiments of the present disclosure. In some embodiments, the temperature measurement system 100 may be applied in various application scenarios, for example, body temperature measurement of one or more persons. As illustrated in FIG. 1, the temperature measurement system 100 may include a server 110, a network 120, an imaging device 130, a terminal device 140, and a storage device 150. The components of the temperature measurement system 100 may be connected in one or more of various ways. Mere by way of example, as illustrated in FIG. 1, the server 110 may be connected to the imaging device 130 through the network 120. As another example, the server 110 may be connected to the imaging device 130 directly (as indicated by the bi-directional arrow in dotted lines linking the server 110 and the imaging device 130). As a further example, the storage device 150 may be connected to the imaging device 130 directly or through the network 120. As still a further example, a terminal device (e.g., 140-1, 140-2, 140-3, etc.) may be connected to the storage device 150 directly (as indicated by the bi-directional arrow in dotted lines linking the terminal 140 and the storage device 150) or through the network 120.

The server 110 may be a single server or a server group. The server group may be centralized or distributed (e.g., the server 110 may be a distributed system). In some embodiments, the server 110 may be local or remote. For example, the server 110 may access information and/or data stored in the imaging device 130, the terminal device 140, and/or the storage device 150 via the network 120. As another example, the server 110 may be directly connected to the imaging device 130, the terminal device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing device 112. The processing device 112 may process data and/or information relating to temperature measurement to perform one or more functions described in the present disclosure. For example, the processing device 112 may identify a target region of an object from an image of the object. The processing device 112 may determine a highest temperature of a target position in the target region based on a thermal image of the object. The processing device 112 may designate the highest temperature as a temperature of the object and/or marking the target position on the image (e.g., thermal image) of the object. In some embodiments, the processing device 112 may include one or more processing engines (e.g., single-core processing engine(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiment, the sever 110 may be omitted and all or part of the functions of the server 110 may be implemented by other components (e.g., the imaging device 130, the terminal device 140) of the temperature measurement system 100. For example, the processing device 112 may be integrated into the imaging device 130 or the terminal device 140 and the functions (e.g., measuring a temperature of an object) of the processing device 112 may be implemented by the imaging device 130 or the terminal device 140.

The network 120 may facilitate the exchange of information and/or data for the temperature measurement system 100. In some embodiments, one or more components (e.g., the server 110, the imaging device 130, the terminal device 140, or the storage device 150) of the temperature measurement system 100 may transmit information and/or data to one or more other components of the temperature measurement system 100 via the network 120. For example, the server 110 may obtain/acquire images from the imaging device 130 via the network 120. As another example, the imaging device 130 may transmit images to the storage device 150 for storage via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The imaging device 130 may be configured to capture image data. In some embodiments, the image data may correspond to at least one image (the "image" herein refers to a single image or a frame of a video). The imaging device 130 may include a thermal imaging device (e.g., an infrared imaging device). The thermal imaging device may capture one or more thermal images of an object. In some embodiments, the thermal imaging device may be mounted near an aisle, a square, an entrance, an exit, etc. The thermal imaging device may acquire thermal images associated with one or more objects in the square, or passing through the aisle, the entrance, the exit, etc. The thermal images may be used to measure temperature information of the one or more objects.

In some embodiments, the imaging device 130 may include a visible imaging device. For example, the imaging device 130 may include a camera 130-1, a video recorder 130-2, a sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. In some embodiments, the imaging device 130 may include a plurality of components each of which can acquire an image. For example, the imaging device 130 may include a plurality of sub-cameras (e.g., a thermal imaging camera and a visible camera) that can capture images or videos simultaneously. In some embodiments, the imaging device 130 may transmit the acquired image to one or more components (e.g., the server 110, the terminal device 140, and/or the storage device 150) of the temperature measurement system 100 via the network 120.

The terminal device 140 may be configured to receive information and/or data from the server 110, the imaging device 130, and/or the storage device 150 via the network 120. For example, the terminal device 140 may receive images and/or videos from the imaging device 130. As another example, the terminal device 140 may transmit instructions to the imaging device 130 and/or the server 110. In some embodiments, the terminal device 140 may provide a user interface via which a user may view information and/or input data and/or instructions to the temperature measurement system 100. For example, the user may view, via the user interface, an image with temperature information of an object obtained from the server 110. As another example, the user may input, via the user interface, an instruction to set a target region of the object. In some embodiments, the terminal device 140 may include a mobile device 140-1, a computer 140-2, a wearable device 140-3, or the like, or any combination thereof. In some embodiments, the terminal device 140 may include a display that can display information in a human-readable form, such as text, image, audio, video, graph, animation, or the like, or any combination thereof. The display of the terminal device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the terminal device 140 may be connected to one or more components (e.g., the server 110, the imaging device 130, and/or the storage device 150) of the temperature measurement system 100 via the network 120.

The storage device 150 may be configured to store data, instructions, and/or any other information. The data and/or instructions may be obtained from, for example, the server 110, the imaging device 130, and/or any other component of the temperature measurement system 100. In some embodiments, the storage device 150 may store data and/or instructions that the server 110 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components (e.g., the server 110, the imaging device 130, or the terminal device 140) of the temperature measurement system 100. One or more components in the temperature measurement system 100 may access the data or instructions stored in the storage device 150 via the network 120. In some embodiments, the storage device 150 may be directly connected to or communicate with one or more other components (e.g., the server 110, the imaging device 130, or the terminal device 140) of the temperature measurement system 100. In some embodiments, the storage device 150 may be part of another component of the temperature measurement system 100, such as the server 110, the imaging device 130, or the terminal device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the temperature measurement system 100 may include one or more additional components and/or one or more components of the temperature measurement system 100 described above may be omitted. Additionally or alternatively, two or more components of the temperature measurement system 100 may be integrated into a single component. A component of the temperature measurement system 100 may be implemented on two or more sub-components.

Figure 2:
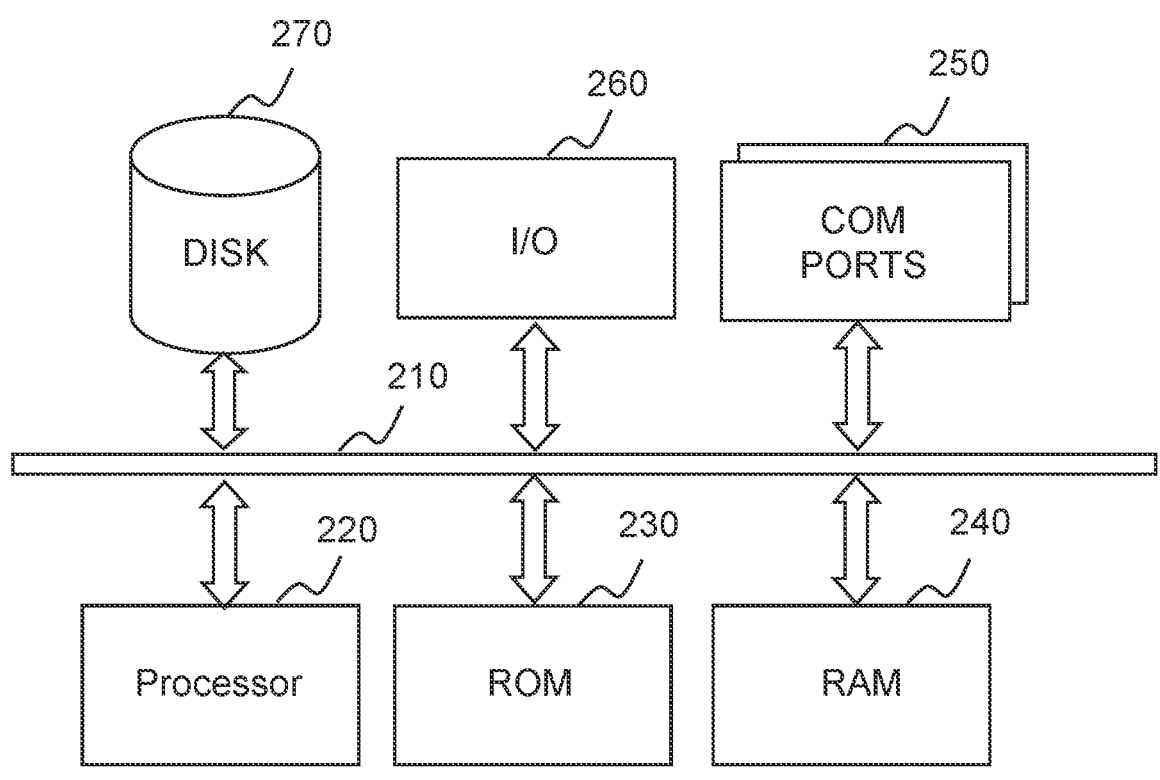
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure.

The computing device 200 may be used to implement any component of the temperature measurement system 100 as described herein. For example, the processing device 112 may be implemented on the computing device 200, via its hardware, software program, firmware, or a combination thereof. Although only one such computer is shown, for convenience, the computer functions relating to temperature measurement as described herein may be implemented in a distributed fashion on a number of similar platforms to distribute the processing load.

The computing device 200, for example, may include communication (COM) ports 250 connected to and from a network connected thereto to facilitate data communications. In some embodiments, the computing device 200 may include a transmission device (not shown) via which the computing device 200 may transmit information and/or data to external components. In some embodiments, the transmission device may include a Network Interface Controller (NIC) connected to an external network device. Alternatively, the transmission device may include a Radio Frequency (RF) module configured to communicate with a network (e.g., the network 120) via a wireless connection.

The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high speed random access memory (not shown), a non-volatile memory (e.g., one or more magnetic storage devices, flash memories, or other non-volatile solid state memory) (not shown), a disk 270, a read-only memory (ROM) 230, or a random-access memory (RAM) 240, or the like, or any combination thereof. In some embodiments, the one or more storages may further include a remote storage corresponding to the processor 220. The remote storage may connect to the computing device 200 via the network 120. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is described in the computing device 200. However, it should be noted that the computing device 200 in the present disclosure may also include multiple processors, and thus operations and/or method operations that are performed by one processor as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 3:
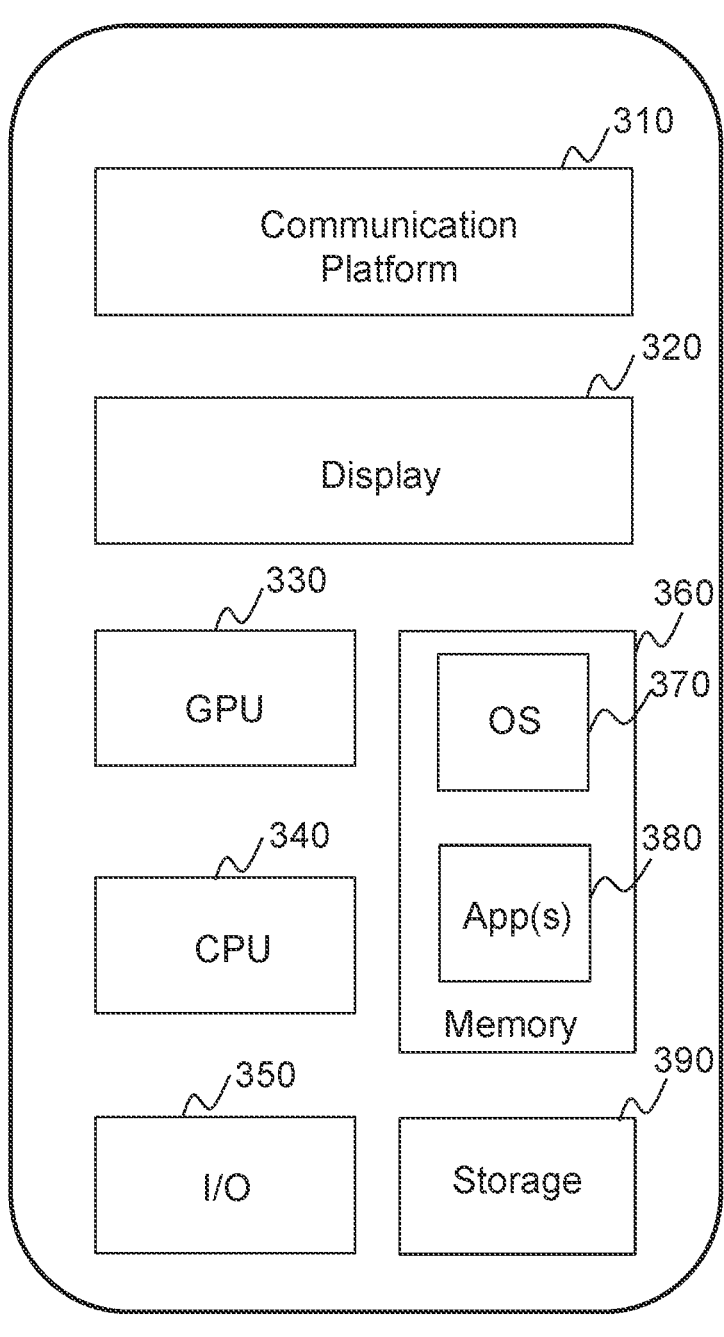
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the terminal device 140 may be implemented on the terminal device 300 shown in FIG. 3.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™, etc.) and one or more applications (Apps) 380 may be loaded into the memory 360 from the storage 390 in order to be executed by the CPU 340. The applications 380 may include a browser or any other suitable mobile apps for receiving and rendering information relating to temperature measurement or other information from the processing device 112. User interactions with the information stream may be achieved via the I/O 350 and provided to the processing device 112 and/or other components of the temperature measurement system 100 via the network 120.

Figure 4:
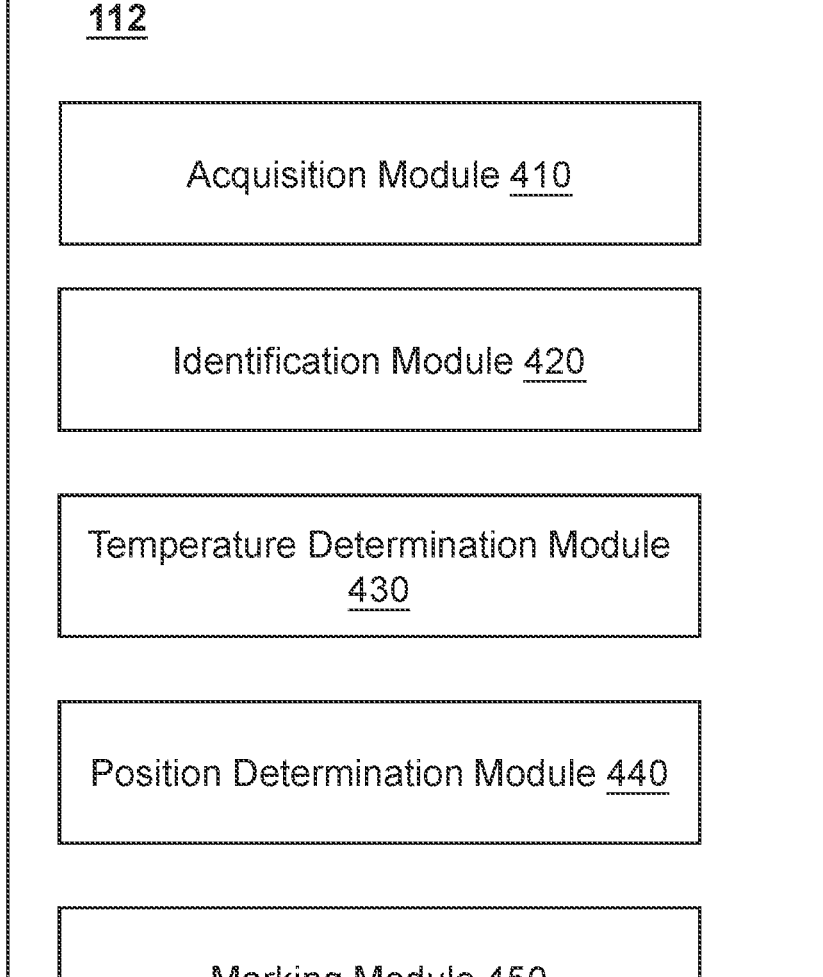
FIG. 4 is a block diagram illustrating an exemplary processing device according to some embodiments of the present disclosure.

FIG. 4 is a block diagram illustrating an exemplary processing device 112 according to some embodiments of the present disclosure. As illustrated in FIG. 4, the processing device 112 may include an acquisition module 410, an identification module 420, a temperature determination module 430, a position determination module 440, and a marking module 450.

The acquisition module 410 may be configured to obtain information and/or data related to temperature measurement. For example, the acquisition module 410 may obtain a thermal image of an object acquired by a thermal imaging device. As another example, the acquisition module 410 may obtain a visible image of the object acquired by a visible imaging device.

The identification module 420 may be configured to identify, in the thermal image, a first portion of the thermal image corresponding to a first target region of the object. In some embodiments, the identification module 420 may identify the first portion of the thermal image based on a boundary box. In some embodiments, the identification module 420 may directly designate a contour of the first target region as the bounding box. In some embodiments, the identification module 420 may determine a circumscribed rectangle (or circumscribed circle) of the contour of the first target region as the bounding box. In some embodiments, the identification module 420 may identify the first portion of the thermal image based on a reference image (e.g., a visible image) of the object acquired by a reference imaging device. The identification module 420 may identify, in the reference image, a first portion of the reference image corresponding to the first target region of the object. The identification module 420 may determine, in the thermal image, the first portion of the thermal image corresponding to the first target region of the object based on the first portion of the reference image and the thermal image.

The temperature determination module 430 may be configured to determine, based on the first portion of the thermal image, one or more relatively high temperatures of the first target region of the object. In some embodiments, the temperature determination module 430 may identify a target pixel with a highest pixel value from pixel values of a plurality of pixels of the first portion of the thermal image. The temperature determination module 430 may determine a relatively high temperature (e.g., the highest temperature) of the first target region of the object based on the pixel value of the target pixel. In some embodiments, the temperature determination module 430 may determine a plurality of temperature values of a plurality of positions in the first target region of the object based on pixel values of a plurality of pixels of the first portion of the thermal image.

The position determination module 440 may be configured to determine one or more target positions in the first target region of the object. The target position(s) may be associated with the relatively high temperature(s). In some embodiments, the position determination module 440 may designate a position corresponding to a pixel (in the first portion of the thermal image) having the highest temperature as a target position. In some embodiments, the position determination module 440 may designate one or more positions corresponding to the one or more pixels (in the first portion of the thermal image) having the relatively high temperatures as the one or more target positions.

The marking module 450 may be configured to mark, in a target image associated with the object, the target position(s). The target image may include the thermal image and/or the reference image of the object. In some embodiments, the marked target image may be displayed on a display device. A plurality of post-processing operations may be performed based on the marked target image. For example, whether a (or each) target position is a misjudgment point (or misjudgment position) may be determined based on the marked target image. As another example, temperature information of the object may be redetermined based on the marked target image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more of the modules may be combined as a single module, and any one of the modules may be divided into two or more units. For example, the acquisition module 410 may be divided into a first acquisition module for acquiring a visible image of an object and a second acquisition module for acquiring a thermal image of the object. As another example, the position determination module 440 and the marking module 450 may be integrated into a single module which may determine the target position associated with the highest temperature and mark the target position on the target image. As a further example, the processing device 112 may include a storage module (not shown) used to store information and/or data (e.g., a thermal image of an object, a target region detection model, temperature information of the object) associated with the temperature measurement system 100.

FIG. 5 is a flowchart illustrating an exemplary process for temperature measurement according to some embodiments of the present disclosure. In some embodiments, a process 500 may be implemented as a set of instructions (e.g., an application) stored in a storage device (e.g., the storage device 150, the ROM 230, or RAM 240). The processing device 112, the processor 220, and/or the modules in FIG. 4 may execute the set of instructions, and when executing the instructions, the processing device 112, the processor 220, and/or the modules in FIG. 4 may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting.

In 510, the processing device 112 (e.g., the acquisition module 410) may obtain a thermal image (also referred to as a first thermal image) of an object acquired by a thermal imaging device. The object may include a human being, an animal, or a portion thereof. For example, the object may include a body of a person or a portion thereof (e.g., the face, the head, an arm, etc.). In some embodiments, the processing device 112 may obtain the thermal image from the thermal imaging device. Alternatively, the thermal image may be acquired by the thermal imaging device and stored in a storage device (e.g., the storage device 150, the storage 390, or an external source). The processing device 112 may retrieve the thermal image from the storage device.

In some embodiments, the first thermal image may include two or more objects. The processing device 112 may segment the first thermal image into one or more thermal images including only one object using a segmentation algorithm. In some embodiments, the segmentation algorithm may include a threshold-based segmentation algorithm, a compression-based algorithm, an edge detection algorithm, a machine learning-based segmentation algorithm, or the like, or any communication thereof. For illustration purposes, a thermal image including one object may be taken as an example of the first thermal image.

The thermal image may include a plurality of pixels with pixel values or characteristics (e.g., luminance values, gray values, color information (e.g., RGB values), saturation values, etc.) associated with temperature information of the object. Each pixel in the thermal image may correspond to a position of the object. A pixel value of each pixel may correspond to a temperature value of the position of the object. In some embodiments, the thermal image may be a two-dimensional (2D) thermal image, a three-dimensional (3D) thermal image, a four-dimensional (4D) thermal image, etc. In some embodiments, the thermal image may be an image frame of a video. For example, the thermal imaging device may capture a video, and the processing device 112 may acquire the video from the thermal imaging device and extract one or more image frames from the video.

The thermal imaging device may include an infrared imaging device. For example, the thermal imaging device may utilize an infrared detector for infrared imaging. The infrared detector may include a photon detector, a thermal detector, a cooled infrared detector, an uncooled infrared detector, a short wave infrared detector, a medium wave infrared detector, a long wave infrared detector, or the like, or any combination thereof. In some embodiments, the thermal imaging device may be mounted near an aisle, a square, an entrance, an exit, etc. The thermal imaging device may capture images of one or more persons located in the square or passing through the aisle, the entrance, or the exit. In some embodiments, the thermal imaging device may be mounted near a designated area. The designated area may be configured to accommodate one or more objects (e.g., one or more persons) that walk slowly or stop for a certain time (e.g., 1 second, 2 seconds, 5 seconds, 10 seconds, etc.) in the area. For example, if the object(s) enters the designated area, the processing device 112 may instruct the thermal imaging device or any other device to broadcast a reminder message (for example, "please slow down") to guide the object(s) to walk slowly or stop, so as to facilitating the thermal imaging device to capture thermal image(s) of the object(s). In some embodiments, a shape of the designated area may include a triangle, a rectangle, a square, a circle, an ellipse, or the like, or any combination thereof. A size of the designated area may include 0.5 m$^2$, 1 m$^2$, 1.5 m$^2$, 2 m$^2$, 5 m$^2$, 50 m$^2$, 100 m$^2$, etc.

In some embodiments, the thermal imaging device may capture one or more thermal images in real time or periodically. The thermal imaging device may transmit the thermal image(s) to the processing device 112 timely. In some embodiments, the processing device 112 may obtain one or more thermal images of one or more objects from the thermal imaging device in real time or periodically. For example, the thermal imaging device may capture the thermal image(s) in real time, and transmit the thermal image(s) to the processing device 112 at a specific frequency. As another example, the thermal imaging device may acquire the thermal image(s) at a specific frequency and may transmit the obtained thermal image(s) to the processing device 112 timely.

In some embodiments, the processing device 112 may be integrated into the thermal imaging device. In other words, the processing device 112 may be implemented by the thermal imaging device.

In 520, the processing device 112 (e.g., the identification module 420) may identify, in the thermal image, a first portion of the thermal image corresponding to a first target region of the object.

As used herein, a target region of the object may refer to a region of interest of the object for temperature detection (or measurement). In other words, the temperature of the object may be determined from the target region of the object. For example, the object may include a human body or the head of the human body, and the target region may include a facial region or a forehead region of the human body. It should be noted in the present disclosure, the term "portion," "position," "location," and "region" in the present disclosure may refer to a location of an anatomical structure shown in an image or an actual location of the anatomical structure existing in or on the object, since the image may indicate the actual location of a certain anatomical structure existing in or on the object.

In some embodiments, the processing device 112 may identify the first portion of the thermal image based on a boundary box. For example, the processing device 112 may designate pixels of the thermal image included in the boundary box as the first portion of the thermal image. The bounding box in the thermal image may enclose a representation of the first target region, that is, the bounding box may represent the first target region. In some embodiments, the bounding box may be 2-dimensional or 3-dimensional. For example, if the thermal image is a 2-dimensional thermal image, the bounding box may have the shape of a square, a rectangle, a triangle, a polygon, a circle, an ellipse, an irregular shape, etc. As another example, if the thermal image is a 3-dimensional thermal image, the bounding box may have the shape of a cube, a cylinder, etc. In some embodiments, the bounding box may be determined manually by a user (e.g., a doctor, an imaging specialist, a technician). For example, the user may draw the bounding box on the thermal image displayed on a user interface.

In some embodiments, the bounding box may be determined, in the thermal image, based on a contour of the first target region of the object. For example, the processing device 112 may directly designate the contour of the first target region as the bounding box. As another example, the processing device 112 may determine a circumscribed rectangle (or circumscribed circle) of the contour of the first target region as the bounding box. It should be noted that once the bounding box is determined, a position and/or a size of the bounding box on the thermal image is determined. In some embodiments, the processing device 112 may display the bounding box on the thermal image for a user to view. In some embodiments, the processing device 112 may determine the contour of the first target region represented in the thermal image using a target region detection or identification model. For example, if the first target region is a face of a human body, the processing device 112 may determine the contour of the face using a face detection/recognition model. Specifically, the processing device 112 may input the thermal image into a trained face detection model. The trained face detection model may output a face image having a representation of the face or the thermal image with a contour box. The processing device 112 may determine the contour of the face based on the output image. In some embodiments, the face detection/recognition model may include a convolutional neural network (CNN) model, a recurrent neural network (RNN) model, a deep neural network (DNN) model, a feedback neural network, a back propagation (BP) neural network, a dyadic wavelet transform algorithm, an elastic model, or the like, or any combination thereof. In some embodiments, the processing device 112 may directly determine the bounding box based on the target region detection or identification model. For example, the processing device 112 may input the thermal image into a trained face detection model. The trained face detection model may directly output the thermal image with the bounding box.

In some embodiments, the bounding box may be defined by at least one of one or more geometric parameters and position parameters. Exemplary geometric parameters may include a shape, a size, of the bounding box, etc. Exemplary position parameters may include coordinates of the center point of the bounding box, coordinates of edge points, coordinates of vertexes of the bounding box, etc. For example, if the bounding box is a rectangle box, the geometric parameters of the bounding box may include a length and a width of the rectangle box, and the position parameters of the bounding box may include coordinates of the center point and/or coordinates of vertexes of the rectangle box. As another example, if the bounding box is a circular box, the geometric parameters of the bounding box may include a radius of the circular box, and the position parameters of the bounding box may include coordinates of the center point of the circular box.

In some embodiments, the geometric parameter(s) and position parameter(s) may be determined automatically by the processing device 112 (e.g., a default setting of the temperature measurement system 100) and/or manually by a user through a terminal device. For example, the geometric parameter(s) and position parameter(s) may be input by a user on a user interface of the terminal device 140. The processing device 112 may identify the first portion from the thermal image based on at least one of the geometric parameter(s) and position parameter(s).

In some embodiments, the processing device 112 may display the bounding box on a display of a terminal device. In some embodiments, a user (e.g., an operator) may adjust the bounding box via a user interface of the terminal device. For example, the user may touch the display of the terminal device to move a position of the bounding box and/or change a size of the bounding box. Then the first portion enclosed by the bounding box can be changed accordingly.

In some embodiments, the first portion may be identified by the processing device 112 automatically according to an image analysis algorithm (e.g., an image segmentation algorithm). For example, the processing device 112 may perform image segmentation on the thermal image using an image segmentation algorithm to identify the first portion. Exemplary image segmentation algorithms may include a threshold-based segmentation algorithm, a compression-based algorithm, an edge detection algorithm, a machine learning-based segmentation algorithm, etc.

In some embodiments, the first portion of the thermal image may be identified based on a reference image of the object acquired by a reference imaging device. The reference image and the thermal image may be images captured by simultaneously photographing the object by the reference imaging device and the thermal imaging device. In some embodiments, the reference image may have a resolution higher than that of the thermal image. The processing device 112 may identify, in the reference image, a first portion of the reference image corresponding to the first target region of the object. The processing device 112 may determine, in the thermal image, the first portion of the thermal image corresponding to the first target region of the object based on the first portion of the reference image and the thermal image. More descriptions regarding the identification of the first portion of the thermal image based on the reference image may be found elsewhere in the present disclosure (e.g., FIG. 6 and the descriptions thereof).

In 530, the processing device 112 (e.g., the temperature determination module 430) may determine, based on the first portion of the thermal image, one or more relatively high temperatures of the first target region of the object.

In some embodiments, a pixel value of a pixel in the thermal image may be correlated with (e.g., positively correlated with) a temperature value of a position of the object corresponding to the pixel. In some embodiments, the higher the pixel value is, the higher the corresponding temperature may be.

In some embodiments, the processing device 112 may identify a target pixel with a highest pixel value from pixel values of a plurality of pixels of the first portion of the thermal image. The processing device 112 may determine a relatively high temperature (e.g., the highest temperature) of the first target region of the object based on the pixel value of the target pixel. For example, the processing device 112 may determine the relatively high temperature (e.g., the highest temperature) by querying a lookup table indicating a relationship between a plurality of pixel values and a plurality of temperature values. In some embodiments, the lookup table may be associated with the thermal imaging device. The lookup table may be determined based on a plurality of calibration experiments, or a simulation technique. For example, the thermal imaging device may capture thermal images of a plurality of blackbody having different temperature values. The processing device 112 or any other processing device may generate the lookup table based on pixel values of the thermal images and the corresponding temperature values. In some embodiments, the lookup table may be denoted in other forms, for example, a fitting function, a graph, etc.

In some embodiments, the processing device 112 may determine a plurality of temperature values of a plurality of positions in the first target region of the object based on pixel values of a plurality of pixels of the first portion of the thermal image. Each position in the first target region may correspond to a pixel in the first portion of the thermal image. Specifically, for each of the plurality of positions in the first target region of the object, the processing device 112 may determine a temperature value of the each position based on a pixel value of a pixel corresponding to the each position and the lookup table. The processing device 112 may determine the one or more relatively high temperatures (e.g., the highest temperature) from the plurality of temperature values. In some embodiments, the processing device 112 may determine temperatures each of which has a pixel value higher than a pixel value threshold as the one or more relatively high temperatures. In some embodiments, the processing device 112 may sort the plurality of temperature values and determine temperatures ranked in the top, such as, 2%, 5%, 10%, etc., as the one or more relatively high temperatures. In some embodiments, the processing device 112 may determine temperatures of the top 5 (or 10, 15, etc.) as the one or more relatively high temperatures.

In 540, the processing device 112 (e.g., the position determination module 440) may determine one or more target positions in the first target region of the object. The target position(s) may be associated with the relatively high temperature(s).

In some embodiments, the processing device 112 may designate a position corresponding to a pixel (in the first portion of the thermal image) having the highest temperature as a target position. In some embodiments, if there is only one pixel having the highest temperature, the processing device 112 may designate a position (in the first target region of the object) corresponding to the pixel as the target position. In some embodiments, if there are two or more pixels having the highest temperature, the processing device 112 may designate two or more positions (in the first target region of the object) corresponding to the two or more pixels as target positions. Alternatively, the processing device 112 may designate the two or more positions as candidate positions, and further determine one or more candidate positions (of the two or more positions) corresponding to pixel(s) that satisfy a constraint condition as the one or more target positions.

In some embodiments, the processing device 112 may designate one or more positions corresponding to the one or more pixels (in the first portion of the thermal image) having the relatively high temperatures as the one or more target positions. Alternatively or additionally, the processing device 112 may designate one or more positions corresponding to the one or more pixels (in the first portion of the thermal image) having the relatively high temperatures as one or more candidate positions, and further determine candidate position(s) corresponding to pixel(s) that satisfy the constraint condition as target position(s).

In some embodiments, the constraint condition may be associated with a position of the first target region (or the bounding box). For example, the processing device 112 may determine a distance between a pixel corresponding to each candidate position and a reference point (e.g., a center point of the first target region (or the bounding box)) in the thermal image. The processing device 112 may designate a candidate position corresponding to a pixel having a shortest distance (or a pixel of which distance is smaller than a threshold) as a target position.

In 550, the processing device 112 (e.g., the marking module 450) may mark, in a target image associated with the object, the target position(s).

The target image may include the thermal image and/or the reference image of the object. For example, the processing device 112 may directly mark the target position in the thermal image. As another example, if the first portion of the thermal image is determined based on the reference image, the processing device 112 may mark the target position(s) in the reference image. In some embodiments, the processing device 112 may mark the target position(s) using marker(s) including for example, a pattern, a letter, a symbol, etc. For example, the target position(s) may be marked with a cross marker in the thermal image and/or the reference image.

In some embodiments, the processing device 112 may display the marked target image on a display device. For example, the processing device 112 may transmit the marked target image to a terminal device (e.g., the terminal device 140) including a display device. The terminal device may display the marked target image.

In some embodiments, the processing device 112 may determine whether a (or each) target position is a misjudgment point (or misjudgment position). In response to a determination that the target position is not a misjudgment point, the processing device 112 may designate a temperature of the target position (e.g., the highest temperature) of the first target region of the object as a temperature of the object. In some embodiments, the processing device 112 may display the temperature of the target position (e.g., the highest temperature) on the display device, for example, near the marker on the thermal image. In some embodiments, in response to a determination that two or more target positions are not misjudgment points, the processing device 112 may designate temperatures of the target positions of the first target region of the object as candidate temperatures of the object. The processing device 112 may further determine the temperature of the object based on the candidate temperatures. For example, the processing device 112 may designate a mean value (or a median value) of the candidate temperatures as the temperature of the object.

As used herein, a misjudgment point may refer to a position in an interference region that may interfere with the temperature measurement. In some embodiments, the interference region may include an eye, the neck, a palm, an ear, or the like, or any combination thereof. For example, for an object (e.g., a person) with eye inflammation, if the target position is located in an eye region (e.g., the target position is a corner of the eye), that is, a temperature of a position (or point) of the eye (which is a misjudgment point) may be regarded as the body temperature. Accordingly, the measured temperature of the person may be inaccurate (e.g., relatively high), because eye inflammation usually raises the temperature around the eye.

In some embodiments, the processing device 112 may automatically determine whether a target position is a misjudgment point (or position). For example, the processing device 112 may use a feature detection algorithm to detect one or more (e.g., five) face key points of a person including for example, two points (e.g., center points) of the eyes, a tip point of the nose, two corner points of the mouth, etc. The processing device 112 may determine whether the target position is a misjudgment point based on the face key points. In some embodiments, if a distance between the target position and one of the face key points (e.g., a central point of an eye) is less than a threshold (e.g., 0.2 cm, 0.5 cm, 1 cm, etc.), the processing device 112 may determine the target position as a misjudgment point. In some embodiments, the processing device 112 may detect a face region of the object using a skin detection algorithm. In some embodiments, the skin detection algorithm may be performed to detect the face region of the object based on the skin color(s) of the object (or skin color difference(s) between different regions of the object). The processing device 112 may determine a jaw position based on a contour of the face region. The processing device 112 may identify a neck region of the object based on the jaw position. If the target position is located in the neck region, the processing device 112 may determine that the target position is a misjudgment point (or position).

In some embodiments, whether the target position is a misjudgment point (or position) may be determined manually. For example, the processing device 112 may transmit the marked target image (e.g., the thermal image with the marker), and one or more misjudgment points to a terminal device. The terminal device may display the marked target image and the misjudgment points. For example, the terminal device may mark the misjudgment points on the marked target image. A user (e.g., an operator) may compare the target position with each of the one or more misjudgment points to judge whether the target position is a misjudgment point based on the displayed marked target image and the one or more misjudgment points, and input a judgment result via the terminal device. In some embodiments, the one or more misjudgment points may be presented in a form of text, audio, graph, etc. For example, the one or more misjudgment points may be displayed in the lower-left corner of the terminal device using a table.

In some embodiments, in response to a determination that the target position is a misjudgment point (or all the target positions are misjudgment points), the processing device 112 may identify, in the thermal image, a second portion of the thermal image corresponding to a second target region of the object. The processing device 112 may determine, based on the second portion of the thermal image, one or more updated relatively high (e.g., the highest) temperatures of the second target region of the object. The processing device 112 may determine one or more updated target positions in the second target region of the object. The updated target position(s) may be associated with the updated relatively high (e.g., the highest) temperatures. The processing device 112 may mark, in the target image, the updated target position(s).

The second portion and the first portion of the thermal image may have different central positions. In some embodiments, the second target region may exclude one or more of the target position(s) of the object determined based on the first target region of the object. For example, the first portion may include eyes, while the second portion may not include the eyes. As another example, the first portion may include a forehead region including at least a portion of an eye, while the second portion of the thermal image may include a face region. The second portion may be identified from the thermal image similar to the identification of the first portion described in connection with operation 520 in the present disclosure. For example, the second portion may be identified manually by a user (e.g., a doctor, an imaging specialist, a technician) by, for example, adjusting the bounding box on the thermal image through a user interface. Specifically, the user may change a shape and/or a size of the bounding box, adjust a position of the bounding box, etc. Then the processing device 112 may identify the second portion based on the adjusted bounding box. As another example, the second portion may be identified by the processing device 112 automatically according to an image analysis algorithm (e.g., an image detection algorithm, an image identification algorithm, an image segmentation algorithm). As a further example, the processing device 112 may identify the second portion based on a default setting of the temperature measurement system 100, for example, by moving the bounding box by a certain distance to the left or right.

In some embodiments, in response to the determination that the target position is a misjudgment point, the processing device 112 may redetect temperature information of the object using the thermal imaging device or a temperature detecting device that is different from the thermal imaging device. For example, the processing device 112 may instruct the thermal imaging device to recapture a thermal image of the object. The processing device 112 may determine the temperature information of the object based on the recaptured thermal image. As another example, a user may redetect the temperature information of the object using a thermometer (e.g., a mercury thermometer, a forehead thermometer).

In some embodiments, in response to the determination that the target position is a misjudgment point, the processing device 112 may send misjudgment information to a terminal device (e.g., the terminal device 140). The misjudgment information may be configured to instruct a user to adjust the first target region, delete the temperature measurement result of the object, redetermine temperature information of the object, etc. In some embodiments, the misjudgment information may include a text, an audio, a video, an image, or the like, or any combination thereof. For example, the misjudgment information may include a message with a text of "Caution! Temperature measurement region is wrong!" The user may adjust the first target region or send a delete command to instruct the temperature measurement system 100 to delete temperature measurement result of the first target region.

It should be noted that in some embodiments, by verifying whether the target position is a misjudgment point, the temperature measurement of the object can be automatically performed again when the target position is a misjudgment point, thereby realizing the automatic exclusion of abnormal temperature measurement regions and effectively improving the accuracy of the temperature measurement. In some embodiments, in response to the determination that the target position is a misjudgment point, only the temperature measurement region (e.g., the first target region) needs to be adjusted, and the temperature measurement equipment (e.g., the thermal imaging device) does not need to be adjusted (or the thermal image may not need to be recaptured), thereby improving the efficiency of the temperature measurement in public places.

In some embodiments, the processing device 112 may determine whether the relatively high (e.g., the highest) temperature is greater than or equal to a temperature threshold. In some embodiments, the temperature threshold may be set according to a default setting of the temperature measurement system 100 or preset by a user or operator via the terminal device 140. For example, the temperature threshold may be set to 36.8° C., 37° C., 37.3° C., 37.5° C., etc. In some embodiments, in response to a determination that the relatively high (e.g., the highest) temperature is greater than or equal to the temperature threshold, the processing device 112 may automatically determine whether the target position is a misjudgment point.

In some embodiments, in response to a determination that the highest temperature is greater than or equal to the temperature threshold, the processing device 112 may send at least one of alarm information, the one or more misjudgment points, and the marked target image to a terminal device (e.g., the terminal device 140). The terminal device may provide or display the marked target image and the one or more misjudgment points to a user in response to the alarm information. The terminal device may receive a determination result of whether the target position is a misjudgment point from the user. For example, the user may compare the target position with each of the one or more misjudgment points, and determine whether the target position is a misjudgment point. The user may input the determination result via a user interface of the terminal device. For example, the user may input the determination result by pressing a button marked by "1" or "0", wherein the button marked by "1" may indicate that the target position is not a misjudgment point and the button marked by "0" may indicate that the target position is a misjudgment point.

In some embodiments, in response to a determination that the target position is not a misjudgment point (e.g., the user presses the button marked by "1"), the processing device 112 may determine that a false alarm is issued, and may display the relatively high (e.g., the highest) temperature on the terminal device accordingly. In some embodiments, in response to a determination that the target position is a misjudgment point (e.g., the user presses the button marked by "0"), the processing device 112 may display prompt information on the terminal device to direct the user to confirm to redetect the temperature information of the object.

In some embodiments, in response to a determination that the relatively high (e.g., the highest) temperature is greater than or equal to the temperature threshold, the processing device 112 may redetermine temperature information of the object. For example, the processing device 112 may obtain a second thermal image of the object acquired by the thermal imaging device. The processing device 112 may identify, in the second thermal image, a third portion of the second thermal image corresponding to a third target region of the object. The processing device 112 may redetermine the relatively high (e.g., the highest) temperature of the first target region of the object by determining, based on the third portion of the second thermal image, a relatively high (e.g., a highest) temperature of the third target region of the object. The processing device 112 may designate the redetermined relatively high (e.g., highest) temperature as the temperature of the object.

The third target region may include one or more of the target position(s). In some embodiments, the third target region may be within the first target region. In some embodiments, the processing device 112 may determine the third portion of the second thermal image based on a mapping relationship between the second thermal image and the first thermal image. For example, the processing device 112 may identify the first target region (or the first portion) in the second thermal image based on the mapping relationship between the second thermal image and the first thermal image. Then the processing device 112 may further identify the target position(s) (of the first target region) in the second thermal image based on the mapping relationship between the second thermal image and the first thermal image. The processing device 112 may shrink the first target region (or the first portion) in the second thermal image to determine the third target region (or the third portion) by, for example, shrinking a bounding box indicating the first portion.

In some embodiments, the third portion may be determined based on the first portion of the reference image, and a mapping relationship between the second thermal image and the reference image. In some embodiments, the processing device 112 may recapture a second reference image. The processing device 112 may determine the third portion based on the recaptured reference image.

In some embodiments, a second distance between the object and the thermal imaging device when the second thermal image is acquired is less than a first distance between the object and the thermal imaging device when the thermal image is acquired. In such cases, the second thermal image may have more accurate temperature information than the first thermal image. The temperature of the object determined based on the second thermal image may be more accurate than the temperature of the object determined based on the first thermal image. Thus, in some embodiments, in order to obtain an accurate temperature result, the processing device 112 may redetermine temperature information of the object. In some embodiments, when the redetermined temperature of the object is also greater than or equal to the temperature threshold, the processing device 112 may determine an average value of the previously determined temperature and the redetermined temperature as the target temperature of the object. In some embodiments, if the redetermined temperature of the object is less than the temperature threshold, the processing device 112 may determine the redetermined temperature as the target temperature of the object.

In some embodiments, the processing device 112 may cause a thermometer to remeasure temperature information of the object. The thermometer may have a precision greater than that of the thermal imaging device. For example, the thermometer may include a mercury thermometer, a forehead thermometer, etc.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the processing device 112 may be integrated into the thermal imaging device and/or the terminal device. In other words, the process 500 may be performed by the thermal imaging device and/or the terminal device. In some embodiments, the thermal imaging device that integrates at least a part of functions of the processing device 112 may also be referred to as a front device, and the terminal device that integrates at least a part of functions of the processing device 112 may also be referred to as a back device. The front device may communicate with the back device. In some embodiments, one or more operations described in the process 500 may be performed by the front device, and the remaining operations may be performed by the back device. For example, operation 510 may be performed by the front device, while operations 520-550 may be performed by the back device. As another example, all the operations of the process 500 may be performed by the front device. The front device may transmit images associated with the temperature measurement system 100 to the back device for display. In some embodiments, all the operations of the process 500 may be performed by the back device to reduce the load of the thermal imaging device.

FIG. 6 is a flowchart illustrating an exemplary process for identifying a portion of a thermal image corresponding to a region of an object according to some embodiments of the present disclosure. In some embodiments, a process 600 may be implemented as a set of instructions (e.g., an application) stored in a storage device (e.g., the storage device 150, the ROM 230 or RAM 240). The processing device 112 (e.g., the processor 220, the modules in FIG. 4) may execute the set of instructions, and when executing the instructions, the processing device 112 may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 illustrated in FIG. 6 and described below is not intended to be limiting. In some embodiments, one or more operations of the process 600 may be performed to achieve at least part of operation 520 as described in connection with FIG. 5.

In 610, the processing device 112 (e.g., the acquisition module 410) may obtain a thermal image of an object acquired by a thermal imaging device. The operation 610 may be similar to or same as the operation 510 of the process as described in FIG. 5 and the descriptions thereof are not repeated here.

In 620, the processing device 112 (e.g., the acquisition module 410) may obtain a reference image of the object acquired by a reference imaging device.

As used herein, the reference image may be an image having a resolution higher than that of the thermal image. For example, the reference image may be a visible image acquired by a visible imaging device. Because a visible image of an object acquired by a visible imaging device is generated by sensing the visible light reflected by the object, the visible image may have a higher resolution than a thermal image captured by a thermal imaging device. Therefore, using the reference image of the object, the portion of the thermal image of the object may be identified more accurately.

In some embodiments, a scene in which the reference imaging device captures the reference image may be similar or the same as a scene in which the thermal imaging device captures the thermal image. For example, the reference imaging device may be mounted near an aisle, a square, an entrance, an exit, etc. The reference imaging device may capture reference images of one or more persons located in the square or passing through the aisle, the entrance, or the exit. As another example, the reference imaging device may be mounted near a designated area that is configured to accommodate the object(s) (e.g., one or more persons) that walk slowly or stop for a certain time (e.g., 1 second, 2 seconds, 5 seconds, 10 seconds, etc.) in the area. As a further example, the reference imaging device may capture the reference image in real time or periodically.

In some embodiments, the thermal imaging device and the reference imaging device may be integrated into a single device to form a binocular imaging device (e.g., a binocular camera). In some embodiments, the reference image and the thermal image may be captured by the reference imaging device and the thermal imaging device simultaneously. Accordingly, the processing device 112 may obtain the reference imaging device and the thermal imaging device simultaneously. In some embodiments, the reference imaging device may include a card digital camera, a manual camera, an auto focus camera, a telephoto camera, a wide field camera, a single lens reflex (SLR) camera, a digital single lens reflex (DSLR) camera, or the like, or any combination thereof.

The reference image may include a plurality of reference pixels with pixel values or characteristics (e.g., luminance values, gray values, color information (e.g., RGB values), saturation values, etc.). Each reference pixel of the reference image may correspond to a pixel (also referred to as "thermal pixel") of the thermal image, that is, a reference pixel in the reference image and a pixel in the thermal image may correspond to a same physical position or point of the object.

In 630, the processing device 112 (e.g., the identification module 420) may identify, in the reference image, a first portion of the reference image corresponding to the first target region of the object.

In some embodiments, the determination of the first portion of the reference image may be similar to the determination of the first portion of the thermal image described in operation 520 in FIG. 5. For example, the first portion of the reference image may be determined based on a bounding box. The bounding box may be determined based on a contour of the first target region of the object. As another example, the bounding box may be defined by at least one of one or more geometric parameters and positions param- eters. As a further example, the first portion of the reference image may be identified by the processing device 112 automatically according to an image analysis algorithm (e.g., an image segmentation algorithm).

In 640, the processing device 112 (e.g., the identification module 420) may determine, in the thermal image, the first portion of the thermal image corresponding to the first target region of the object, based on the first portion of the reference image and the thermal image.

In some embodiments, the processing device 112 may determine a mapping relationship between the reference image and the thermal image by registering the reference image and the thermal image. For example, the processing device 112 may determine the coordinate of each reference pixel in the reference image in a first coordinate system of the reference imaging device. The processing device 112 may determine the coordinate of each thermal pixel in the thermal image in a second coordinate system of the thermal imaging device. The processing device 112 may determine the mapping relationship between the reference image and the thermal image by mapping the coordinate of each reference pixel to the corresponding coordinate of each thermal pixel. In some embodiments, the processing device 112 may register the reference image and the thermal image using an image registration technique. Exemplary image registration techniques may include a grayscale-based tech- nique, a transform-domain based technique, a feature-based technique, or the like, or any combination thereof.

The processing device 112 may determine, in the thermal image, the first portion of the thermal image corresponding to the first target region of the object based on the mapping relationship by mapping the first portion of the reference image into the thermal image. For example, the processing device 112 may obtain position information of the first target region of the object in the reference image (i.e., the first portion of the reference image). The processing device 112 may determine position information of the first target region of the object in the thermal image (or the first portion of the thermal image) by mapping the position information of the first target region of the object in the reference image into the thermal image based on the mapping relationship.

In some embodiments, the first coordinate system and/or the second coordinate system may be set manually by a user or a default setting of the temperature measurement system 100. In some embodiments, the first coordinate system, the second coordinate system, and/or the mapping relationship between the first coordinate system and the second coordi- nate system may be adjusted based on calibration parameters determined by camera calibration. In some embodiments, the first coordinate system, the second coordinate system, and the mapping relationship may be updated regularly.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure and are within the spirit and scope of the exem- plary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appre- ciated that two or more references to "an embodiment" or "one embodiment" or "an alternative embodiment" in vari- ous portions of this specification are not necessarily all referring to the same embodiment. Furthermore, the particu- lar features, structures or characteristics may be combined as suitable in one or more embodiments of the present disclo- sure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-read- able media having computer readable program code embod- ied thereon.

A non-transitory computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, opti- cal fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural program- ming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for temperature measurement, comprising:
at least one storage device storing executable instructions, and
at least one processor in communication with the at least one storage device, wherein when executing the executable instructions, the at least one processor is directed to cause the system to perform operations including:
obtaining a thermal image of an object acquired by a thermal imaging device;
identifying, in the thermal image, a first portion of the thermal image corresponding to a first target region of the object;
determining, based on the first portion of the thermal image, a highest temperature of the first target region of the object;
determining a target position in the first target region of the object, the target position being associated with the highest temperature; and
marking, in a target image associated with the object, the target position;
determining whether the target position is a misjudgment point; and
in response to a determination that the target position is the misjudgment point, sending misjudgment information to a terminal device, the misjudgment information being at least configured to instruct a user to adjust the first target region, or redetermine temperature information of the object.

2. The system of claim 1, wherein the identifying, in the thermal image, a first portion of the thermal image corresponding to a first target region of the object includes:
determining, in the thermal image, a bounding box based on a contour of the first target region of the object; and
identifying the first portion of the thermal image based on the bounding box.

3. The system of claim 1, wherein the identifying, in the thermal image, a first portion of the thermal image corresponding to a first target region of the object includes:
obtaining a reference image of the object acquired by a reference imaging device;
identifying, in the reference image, a first portion of the reference image corresponding to the first target region of the object; and
determining, in the thermal image, the first portion of the thermal image corresponding to the first target region of the object, based on the first portion of the reference image and the thermal image.

4. The system of claim 3, wherein the determining, in the thermal image, the first portion of the thermal image corresponding to the first target region of the object, based on the first portion of the reference image and the thermal image includes:
determining a mapping relationship between the reference image and the thermal image by registering the reference image and the thermal image; and
determining, in the thermal image, the first portion of the thermal image corresponding to the first target region of the object, by mapping, based on the mapping-relationship, the first portion of the reference image into the thermal image.

5. The system of claim 1, wherein the determining, based on the first portion of the thermal image, a highest temperature of the first target region of the object includes:

determining, based on pixel values of a plurality of pixels of the first portion of the thermal image, a plurality of temperature values of a plurality of positions in the first target region of the object; and identifying the highest temperature from the plurality of temperature values.

6. The system of claim 5, wherein the determining, based on pixel values of a plurality of pixels of the first portion of the thermal image, a plurality of temperature values of a plurality of positions in the first target region of the object includes:

for each of the plurality of positions in the first target region of the object, determining a temperature value of the each position based on a pixel value of a pixel corresponding to the each position and a lookup table indicating a relationship between a plurality of pixel values and a plurality of temperature values.

7. The system of claim 1, wherein the determining whether the target position is a misjudgment point includes:

determining at least one face key point of the object, wherein the at least one face key point includes a center point of an eye, a tip point of a nose, or a corner point of a mouth; and determining that the target position is the misjudgment point when a distance between the target position and the face key point is less than a predetermined threshold.

8. The system of claim 7, wherein the at least one processor is further directed to cause the system to perform operations including:

in response to the determination that the target position is the misjudgment point, identifying, in the thermal image, a second portion of the thermal image corresponding to a second target region of the object, the second portion and the first portion of the thermal image having different central positions;

determining, based on the second portion of the thermal image, an updated highest temperature of the second target region of the object;

determining an updated target position in the second target region of the object, the updated target position being associated with the updated highest temperature; and marking, in the target image, the updated target position.

9. The system of claim 8, wherein the at least one processor is further directed to cause the system to perform operations including:

in response to a determination that the target position is not the misjudgment point, designating the highest temperature of the first target region of the object as a temperature of the object.

10. The system of claim 9, wherein the at least one processor is further directed to cause the system to perform operations including:

in response to the determination that the target position is the misjudgment point, redetecting the temperature information of the object using the thermal imaging device or a temperature detecting device that is different from the thermal imaging device.

11. The system of claim 10, wherein the at least one processor is further directed to cause the system to perform operations including:

determining whether the highest temperature is greater than or equal to a temperature threshold;

in response to a determination that the highest temperature is greater than or equal to the temperature threshold, sending alarm information, one or more misjudgment points, and the marked target image to the terminal device.

12. The system of claim 11, wherein the terminal device is configured to:

provide the marked target image and the one or more misjudgment points to the user in response to the alarm information; and receive a determination result of whether the target position is the misjudgment point from the user.

13. The system of claim 12, wherein the at least one processor is further directed to cause the system to perform operations including:

obtaining a second thermal image of the object acquired by the thermal imaging device;

identifying, in the second thermal image, a third portion of the second thermal image corresponding to a third target region of the object, the third target region including the target position, the third target region being within the first target region;

redetermining the highest temperature of the first target region of the object by determining, based on the third portion of the second thermal image, a highest temperature of the third target region of the object; and designating the redetermined highest temperature as the temperature of the object.

14. The system of claim 1, wherein the first target region includes at least one of a facial region or a forehead region of the object.

15. A method implemented on a computing device including at least one processor and at least one storage medium, and a communication platform connected to a network, the method comprising:

obtaining a thermal image of an object acquired by a thermal imaging device;

identifying, in the thermal image, a first portion of the thermal image corresponding to a first target region of the object;

determining, based on the first portion of the thermal image, a highest temperature of the first target region of the object;

determining a target position in the first target region of the object, the target position being associated with the highest temperature; and marking, in a target image associated with the object, the target position;

determining whether the target position is a misjudgment point; and in response to a determination that the target position is the misjudgment point, sending misjudgment information to a terminal device, the misjudgment information being at least configured to instruct a user to adjust the first target region, or redetermine temperature information of the object.

16. A non-transitory computer readable medium, comprising executable instructions that, when executed by at least one processor, direct the at least one processor to perform a method, the method comprising:

obtaining a thermal image of an object acquired by a thermal imaging device;

identifying, in the thermal image, a first portion of the thermal image corresponding to a first target region of the object;

determining, based on the first portion of the thermal image, a highest temperature of the first target region of the object;

determining a target position in the first target region of the object, the target position being associated with the highest temperature; and marking, in a target image associated with the object, the target position;

determining whether the target position is a misjudgment point; and in response to a determination that the target position is the misjudgment point, sending misjudgment information to a terminal device, the misjudgment information being at least configured to instruct a user to adjust the first target region, or redetermine temperature information of the object.

17. The method of claim 15, wherein the identifying, in the thermal image, a first portion of the thermal image corresponding to a first target region of the object includes:

determining, in the thermal image, a bounding box based on a contour of the first target region of the object; and identifying the first portion of the thermal image based on the bounding box.

18. The method of claim 15, wherein the identifying, in the thermal image, a first portion of the thermal image corresponding to a first target region of the object includes:

obtaining a reference image of the object acquired by a reference imaging device;

identifying, in the reference image, a first portion of the reference image corresponding to the first target region of the object; and determining, in the thermal image, the first portion of the thermal image corresponding to the first target region of the object, based on the first portion of the reference image and the thermal image.

19. The system of claim 13, wherein the at least one processor is further directed to cause the system to perform operations including:

in response to a determination that the redetermined highest temperature is greater than or equal to the temperature threshold, determining an average value of the highest temperature of the first target region and the redetermined highest temperature as a final temperature of the object; and in response to a determination that the redetermined highest temperature is less than the temperature threshold, designating the redetermined highest temperature as the final temperature of the object.

20. The system of claim 19, wherein the at least one processor is further directed to cause the system to perform operations including:

the misjudgment point refers to a position in an interference region that interferes with the temperature measurement, wherein the interference region comprises at least one of an eye, a neck, a palm, or an ear of the object.

\* \* \* \* \*